(12) United States Patent
Pavao et al.

(10) Patent No.: US 7,165,852 B2
(45) Date of Patent: Jan. 23, 2007

(54) BREAKAWAY EXTERIOR REARVIEW MIRROR ASSEMBLY

(75) Inventors: Leo W. Pavao, West Olive, MI (US); Daniel D. Kasbohm, Grand Haven, MI (US); Amit S. Barve, Holland, MI (US)

(73) Assignee: Donnelly Corporation, Holland, MI (US)

( * ) Notice: Subject to any disclaimer, the term of this patent is extended or adjusted under 35 U.S.C. 154(b) by 86 days.

(21) Appl. No.: 10/795,628

(22) Filed: Mar. 8, 2004

(65) Prior Publication Data

US 2004/0233557 A1 Nov. 25, 2004

Related U.S. Application Data

(60) Provisional application No. 60/456,198, filed on Mar. 20, 2003.

(51) Int. Cl.
*G02B 1/076* (2006.01)

(52) U.S. Cl. .................................. 359/841; 248/479

(58) Field of Classification Search .............. 359/841, 359/872, 877; 248/476, 479, 900
See application file for complete search history.

(56) References Cited

U.S. PATENT DOCUMENTS

| | | | |
|---|---|---|---|
| 3,118,965 A | 1/1964 | Jones | 88/93 |
| 3,119,591 A | 1/1964 | Malecki | 248/282 |
| 3,420,490 A | 1/1969 | Malachowski | 248/486 |
| 4,135,694 A | 1/1979 | Stegenga et al. | 248/478 |
| 4,274,078 A | 6/1981 | Isobe et al. | 340/98 |
| 4,315,614 A | 2/1982 | Stegenga et al. | 248/479 |
| 4,475,100 A | 10/1984 | Duh | 340/98 |
| D285,549 S | 9/1986 | Haack | D12/187 |
| 4,692,000 A | 9/1987 | Wada et al. | 350/637 |
| 4,711,538 A | 12/1987 | Ohs et al. | 350/604 |
| 4,730,913 A | 3/1988 | Boothe | 350/604 |
| 4,740,066 A | 4/1988 | Whitehead | 350/604 |
| 4,789,232 A | 12/1988 | Urbanek | 350/632 |
| 4,793,582 A | 12/1988 | Bronstein et al. | 248/486 |
| 4,807,096 A | 2/1989 | Skogler et al. | 362/142 |
| 4,809,137 A | 2/1989 | Yamada | 362/61 |
| 4,815,836 A | 3/1989 | Byers et al. | 350/604 |
| 4,890,907 A | 1/1990 | Vu et al. | 350/605 |
| 4,892,401 A | 1/1990 | Kittridge et al. | 350/626 |
| 4,907,871 A | 3/1990 | Hou | 350/639 |
| 4,911,545 A | 3/1990 | Miller | 350/604 |
| 4,916,430 A | 4/1990 | Vu et al. | 340/463 |
| 4,921,337 A | 5/1990 | Hou | 350/604 |
| 4,988,179 A | 1/1991 | Stensland | 350/637 |
| 4,998,812 A | 3/1991 | Hou | 350/604 |

(Continued)

*Primary Examiner*—Mark A. Robinson
(74) *Attorney, Agent, or Firm*—VanDyke, Gardner, Linn & Burkhart, LLP (57) ABSTRACT

An exterior rearview mirror assembly of a vehicle includes a pivot joint assembly pivotally mounting a movable portion to a base portion of the mirror assembly. The pivot joint assembly includes a support member, a receiving portion and a bracing member. The bracing member engages the receiving portion and extends radially inward toward the support member. The receiving portion is slidably movable relative to the bracing member in the longitudinal direction. A retaining clip is positioned at least partially around the support member and engages the bracing member and limits longitudinal movement of the bracing member relative to the support member. The bracing member is rotationally slidable relative to the receiving portion and/or the retaining clip in response to rotational movement of the receiving portion relative to the support member about a pivot axis.

46 Claims, 4 Drawing Sheets

U.S. PATENT DOCUMENTS

| | | | |
|---|---|---|---|
| 5,017,903 A | 5/1991 | Krippelz, Sr. | 340/472 |
| 5,028,029 A | 7/1991 | Beck et al. | 248/479 |
| 5,061,056 A | 10/1991 | You | 359/872 |
| 5,096,283 A | 3/1992 | Croteau | 359/865 |
| 5,109,214 A | 4/1992 | Heidman, Jr. | 340/475 |
| 5,155,625 A | 10/1992 | Komatsu et al. | 359/512 |
| D331,216 S | 11/1992 | McGouldrick | D12/187 |
| 5,170,288 A | 12/1992 | Imaizumi et al. | 359/507 |
| 5,178,448 A | 1/1993 | Adams et al. | 362/83.1 |
| 5,210,651 A | 5/1993 | Shibuya et al. | 359/841 |
| 5,217,197 A | 6/1993 | Spitzer | 248/479 |
| 5,245,480 A | 9/1993 | Polzer | 359/841 |
| 5,268,795 A | 12/1993 | Usami | 359/881 |
| 5,292,100 A | 3/1994 | Byers et al. | 248/480 |
| 5,313,335 A | 5/1994 | Gray et al. | 359/839 |
| 5,432,640 A | 7/1995 | Gilbert et al. | 359/841 |
| 5,475,530 A | 12/1995 | Fujie et al. | 359/512 |
| 5,483,385 A | 1/1996 | Boddy | 359/841 |
| 5,489,080 A | 2/1996 | Allen | 248/480 |
| 5,513,048 A | 4/1996 | Chen | 359/881 |
| 5,546,239 A | 8/1996 | Lewis | 359/855 |
| 5,557,476 A | 9/1996 | Oishi | 359/841 |
| 5,572,376 A | 11/1996 | Pace | 359/877 |
| 5,579,178 A * | 11/1996 | Mochizuki | 359/841 |
| 5,623,374 A | 4/1997 | Montanbault | 359/841 |
| 5,669,699 A | 9/1997 | Pastrick et al. | 362/83.1 |
| 5,734,517 A * | 3/1998 | Kang | 359/877 |
| 5,760,977 A | 6/1998 | Leder et al. | 359/841 |
| 5,863,116 A | 1/1999 | Pastrick et al. | 362/494 |
| 5,867,328 A * | 2/1999 | Stapp et al. | 359/841 |
| 5,871,275 A | 2/1999 | O'Farrell et al. | 362/494 |
| 5,903,402 A | 5/1999 | Hoek | 359/841 |
| 5,949,591 A | 9/1999 | Whitehead | 359/841 |
| 5,969,890 A | 10/1999 | Whitehead | 359/841 |
| 6,109,586 A | 8/2000 | Hoek | 248/476 |
| 6,176,602 B1 | 1/2001 | Pastrick et al. | 362/494 |
| 6,199,993 B1 | 3/2001 | Mou | 359/864 |
| 6,227,689 B1 | 5/2001 | Miller | 362/494 |
| 6,243,218 B1 | 6/2001 | Whitehead | 359/877 |
| 6,276,805 B1 | 8/2001 | Home et al. | 359/841 |
| 6,276,808 B1 | 8/2001 | Foote et al. | 359/877 |
| 6,280,069 B1 | 8/2001 | Pastrick et al. | 362/494 |
| 6,296,379 B1 | 10/2001 | Pastrick | 362/494 |
| 6,299,333 B1 | 10/2001 | Pastrick et al. | 362/494 |
| 6,322,221 B1 * | 11/2001 | van de Loo | 359/841 |
| 6,390,630 B1 * | 5/2002 | Ochs | 359/841 |
| 6,416,208 B2 | 7/2002 | Pastrick et al. | 362/494 |
| 6,582,087 B2 | 6/2003 | Whitehead et al. | 359/841 |
| 6,616,314 B2 | 9/2003 | Thau | 362/494 |
| 2003/0026012 A1 | 2/2003 | Pavao | 359/841 |

* cited by examiner

BREAKAWAY EXTERIOR REARVIEW MIRROR ASSEMBLY

CROSS REFERENCE TO RELATED APPLICATION

The present application claims benefit of U.S. provisional application, Ser. No. 60/456,198, filed Mar. 20, 2003 by Pavao for BREAKAWAY EXTERIOR REARVIEW MIRROR ASSEMBLY, which is hereby incorporated herein by reference in its entirety.

FIELD OF THE INVENTION

The present invention relates generally to exterior rearview mirror assemblies for vehicles and, more particularly, to a breakaway exterior rearview mirror assembly which includes a movable or head portion that is pivotable relative to the vehicle between a folded position and an extended or use position.

BACKGROUND OF THE INVENTION

It is well known in the automotive mirror art to provide a breakaway exterior rearview mirror assembly on a vehicle, wherein a head portion or movable portion of the mirror assembly may be pivotable via a pivot joint or breakaway joint assembly, such that the movable portion or head portion may be pivotable about a generally vertical pivot axis relative to a sail or base or fixed portion of the mirror assembly. The movable portion may be pivoted about the fixed portion and may be biased into one or more detent positions via a spring positioned generally around a post or support of the fixed portion. An upper end of the spring may engage a spring clip which may be generally fixedly positioned around the post of the fixed portion of the mirror assembly. Due to clearances between the spring clip and the movable portion, conventional mirror assemblies may have an undesirable amount of lateral displacement of an upper portion of the movable portion relative to the post of the fixed portion, commonly referred to as "head rock".

SUMMARY OF THE INVENTION

The present invention provides a breakaway exterior rearview mirror assembly which includes a movable portion or head portion that is pivotable relative to a fixed portion or base portion mountable to an exterior portion of a vehicle. The breakaway exterior rearview mirror assembly of the present invention provides a washer member or ring or bracing member which is positioned between a spring clip and a spring of a pivot joint of the mirror assembly. The bracing member may function to limit or substantially reduce head displacement or head rock or side-to-side movement of the head portion and to enhance vibrational performance of the exterior rearview mirror assembly.

According to an aspect of the present invention, an exterior rearview mirror assembly for a vehicle includes a base portion mounted to the vehicle and a movable portion pivotally mounted to the base portion. The base portion includes a support member, such as a generally cylindrical post or support, which generally defines a pivot axis. The movable portion is pivotable about the pivot axis and includes a receiving portion for at least partially receiving the support member therethrough. The mirror assembly includes a washer member or bracing member which inserts at least partially within and engages the receiving portion and extends radially inward toward the support member. The base portion includes a retaining clip around the support member which engages the bracing member and limits longitudinal movement of the bracing member relative to the support member. The receiving portion is slidably movable relative to the bracing member in the longitudinal direction. The bracing member is rotationally slidable relative to at least one of the receiving portion and the retaining clip in response to rotational movement of the receiving portion relative to the base portion about the pivot axis.

The receiving portion may define a generally conical-shaped or sloped inner surface of a sidewall. The bracing member may include a generally correspondingly formed or shaped outer portion and may be press fit or engaged with the inner surface of the sidewall of the receiving portion. In one form, the bracing member may define a gap between an inner edge of the bracing member and the support member. In another form, the bracing member may slidably engage the support member.

The exterior rearview mirror assembly may include a biasing member which functions to bias a detent portion of the receiving portion away from the bracing member and the retaining clip. The biasing member may bias the receiving portion into at least one detent position for substantially retaining the movable portion relative to the base portion.

The bracing member may comprise a polymeric material. The bracing member may provide a low friction surface for engaging the retaining clip and/or a low friction surface for engaging the sidewall of the receiving portion.

Therefore, the present invention provides a breakaway exterior rearview mirror assembly which includes a pivot joint having a bracing member that may be positioned generally around a post of a base portion of the mirror assembly and may be press fit or engaged with an inner surface of a sidewall of the movable portion of the mirror assembly. The bracing member may provide for enhanced sliding engagement or frictional engagement with a spring clip or retainer as the movable portion is pivoted relative to the base portion. The frictional engagement between the bracing member and both the spring clip and the sidewall of the movable portion may provide for enhanced vibrational performance of the exterior rearview mirror assembly. The bracing member may substantially span or extend between the sidewall of the movable portion and the pivot post or support member of the base portion. The bracing member thus may reduce head displacement or "head rock" of the movable portion relative to the base portion of the mirror assembly.

These and other objects, advantages, purposes and features of the present invention will become apparent upon review of the following specification in conjunction with the drawings.

DESCRIPTION OF THE PREFERRED EMBODIMENTS

Figure 1:
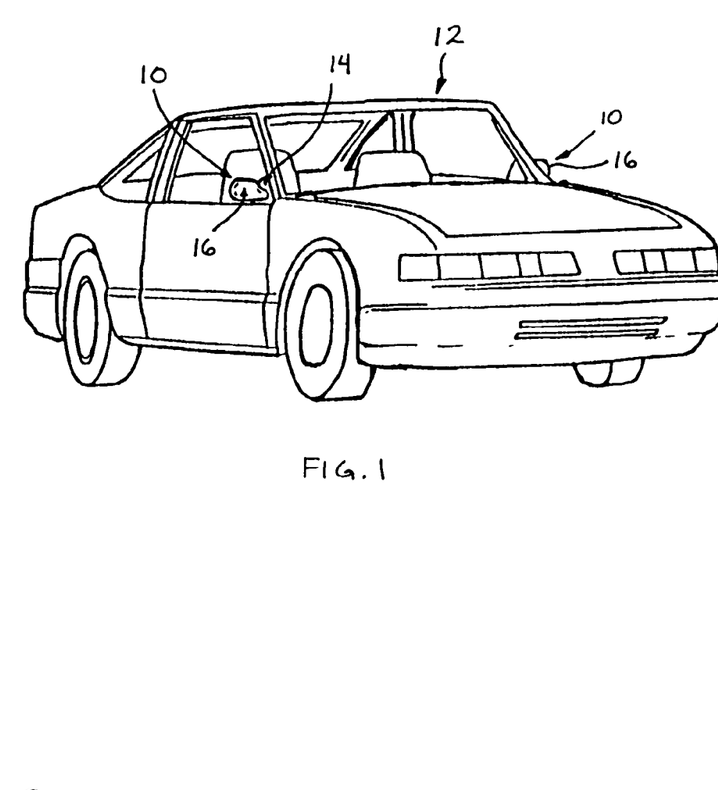
FIG. 1 is a perspective view of a vehicle having a breakaway exterior rearview mirror assembly in accordance with the present invention.
Figure 2:
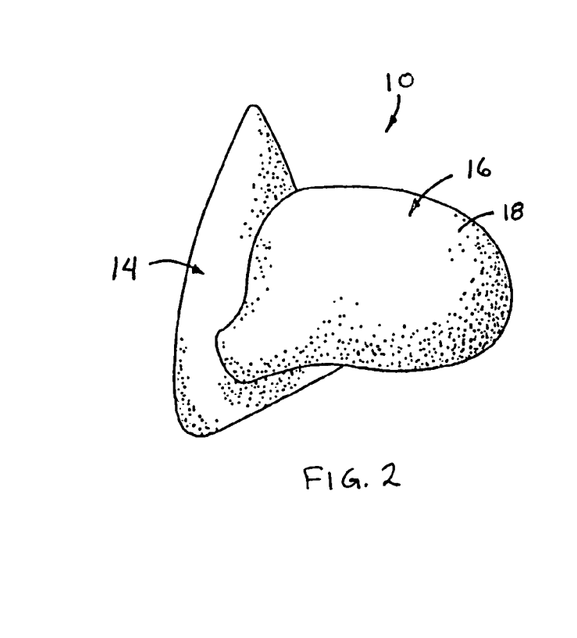
FIG. 2 is an enlarged perspective view of a breakaway exterior rearview mirror assembly of the present invention.
Figure 3:
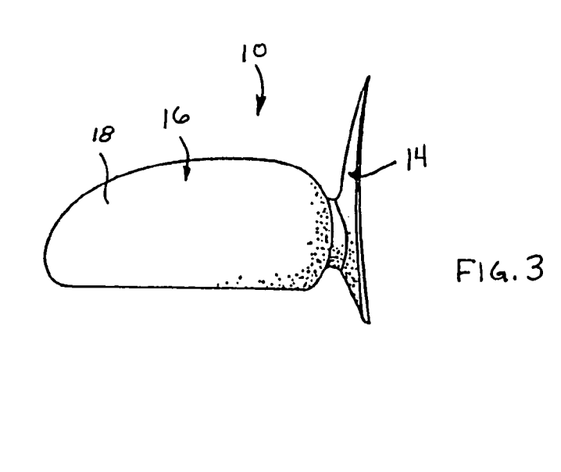
FIG. 3 is an upper plan view of the breakaway exterior rearview mirror assembly of FIG. 2.
Figure 4:
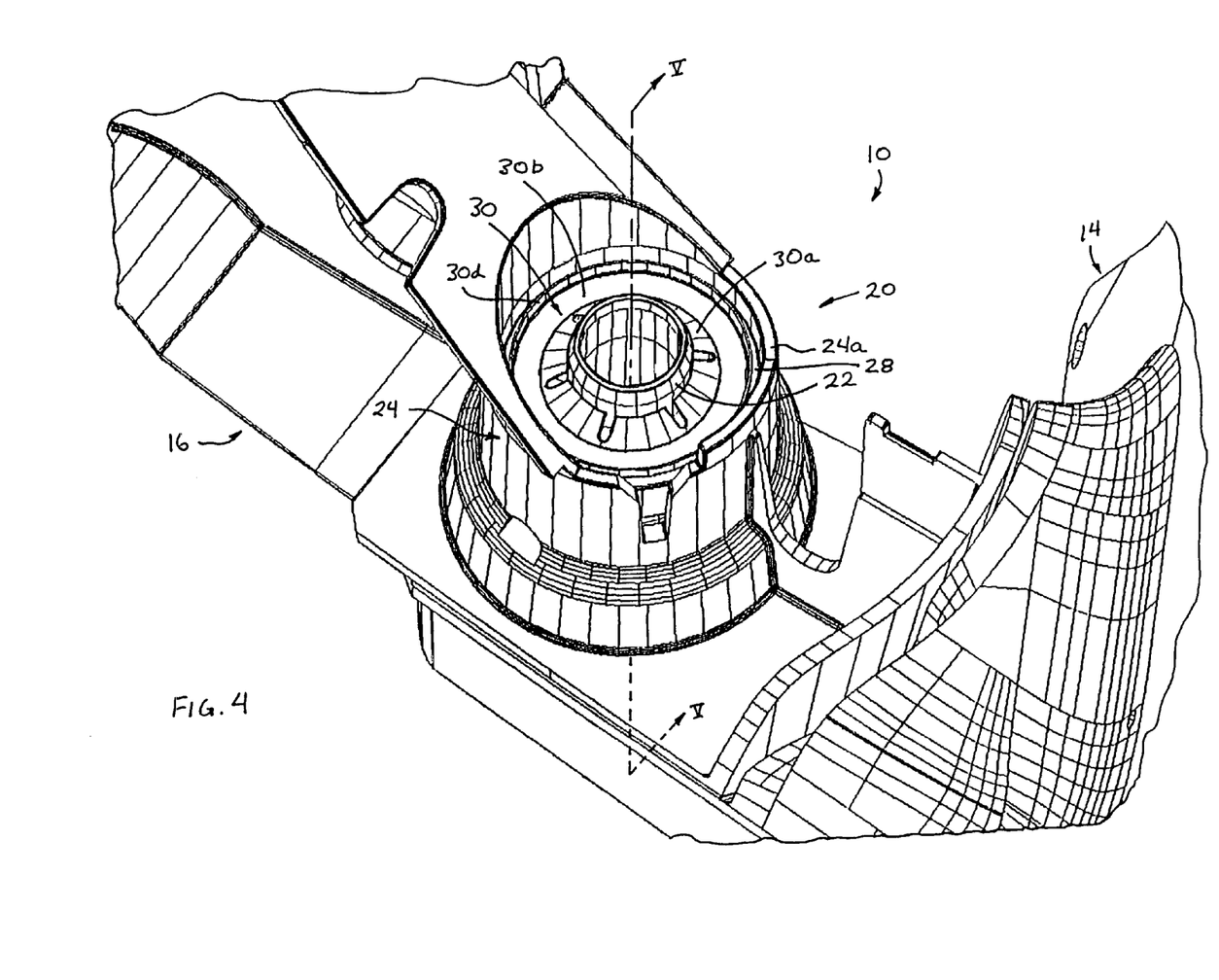
FIG. 4 is an upper perspective view of a breakaway pivot joint for the exterior rearview mirror assembly of the present invention.
Figure 5:
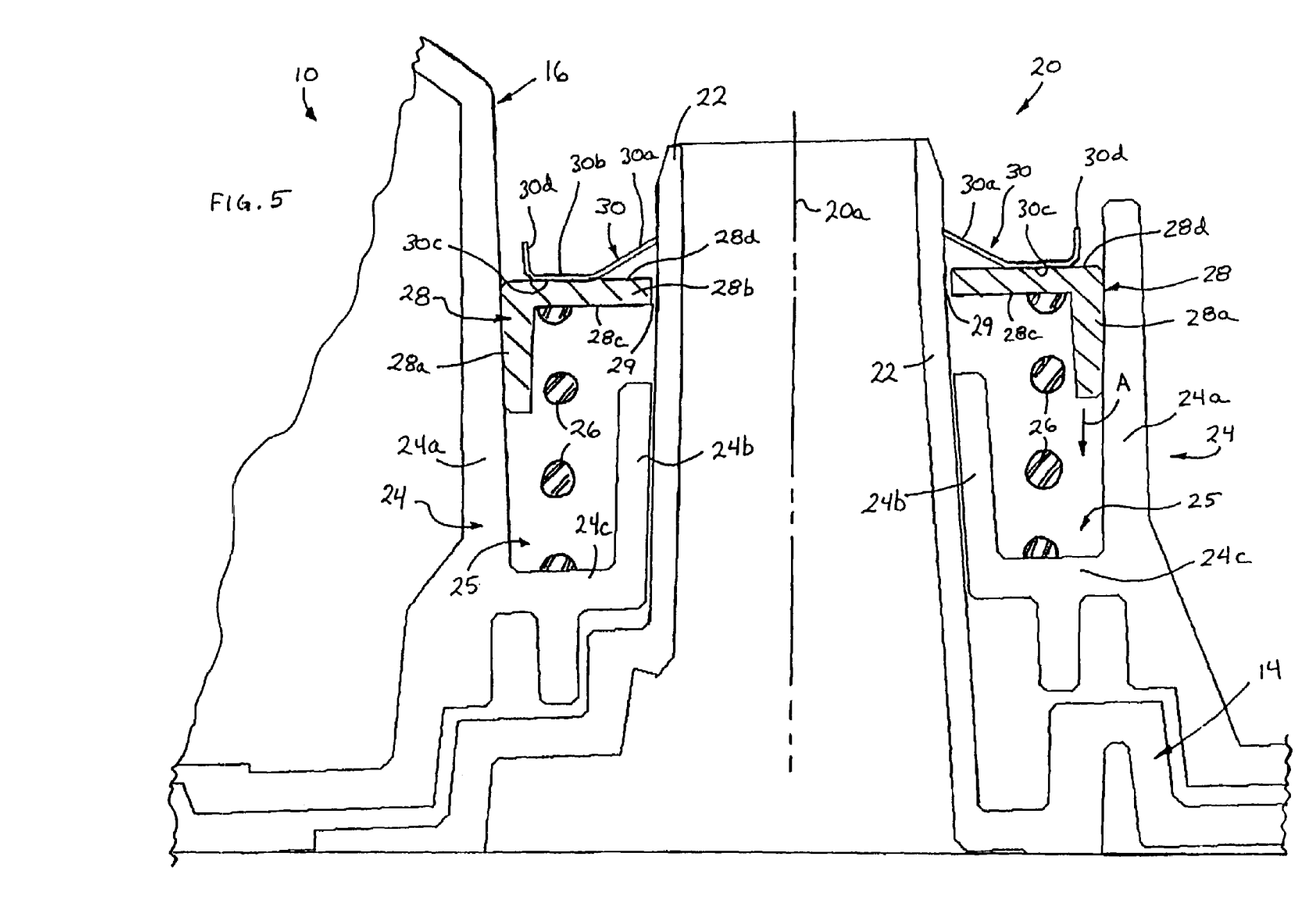
FIG. 5 is a sectional view of the mirror assembly taken along the line V—V in FIG. 4.

Referring now to the drawings and the illustrative embodiments depicted therein, a breakaway exterior rearview mirror assembly 10 is mounted to an exterior portion of one or both sides of a vehicle 12 (FIG. 1). Breakaway exterior mirror assembly 10 includes a generally fixed or non-movable base portion or mounting portion or sail portion 14, which is mounted to or affixed to the exterior portion of vehicle 12, and a head portion or movable portion 16, which is pivotally mounted to base portion 14 (FIGS. 1–3). Head portion 16 of exterior rearview mirror assembly 10 includes a casing 18 and a reflective element (not shown) positioned at casing 18. Head portion 16 is adjustable or movable or pivotable relative to fixed portion 14 about a pivot joint or breakaway joint assembly 20 (FIGS. 4 and 5). Pivot joint assembly 20 facilitates pivotal movement of head portion 16 relative to fixed portion 14 about a pivot axis 20*a*, and may substantially retain head portion 16 relative to fixed portion 14 in one or more detent positions, as discussed below.

As shown in FIGS. 4 and 5, pivot joint assembly 20 of exterior rearview mirror assembly 10 includes a pivot post or support 22 which extends generally vertically upward from fixed portion 14 and defines pivot axis 20*a*. Head portion 16 includes a ring portion or receiving portion 24 which pivotally receives post 22 at least partially therethrough to pivotally mount head portion 16 to post 22 of fixed portion 14. Post 20 of base portion 14 may comprise a hollow post having a passageway or wire-way for routing a wire or cable (not shown) therethrough to supply power or control signals to one or more electrical accessories at or within head portion 16, such as a wire-way of the type disclosed in U.S. Pat. No. 5,863,116, which is hereby incorporated herein by reference.

Head portion 16 and/or fixed portion 14 may also include one or more detents (not shown), such as recesses or the like, and/or one or more detent engaging devices (also not shown), such as balls or tabs or protrusions or the like, for engaging the recesses or the like around receiving portion 24 and/or post 22 to provide one or more positions at which head portion 16 may be substantially retained by the detents and detent engaging devices, as discussed below. The head portion 16 may be biased toward and into one or more of the detent positions via a biasing member or spring 26, as discussed below.

Figure 6:
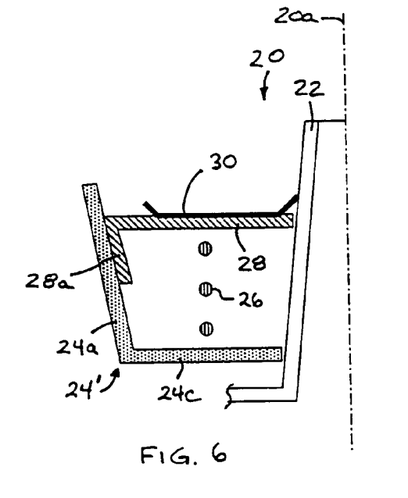
FIG. 6 is a sectional view of one side of a breakaway pivot joint similar to the one shown in FIGS. 4 and 5.

Receiving portion 24 may include an outer wall 24*a* and an inner wall 24*b* and a base portion 24*c* which define a generally U-shaped ring 25 around post 22. Outer wall 24*a* may define an inner surface which may be generally conical-shaped or sloped (as best shown in FIGS. 5 and 6), such that a lower end of wall 24*a* has a narrower diameter than an upper end of wall 24*a* of receiving portion 24. The embodiment shown in FIG. 6 may be substantially similar to that of FIG. 5, but the receiving portion 24' does not include an inner wall extending along the post 22.

Pivot joint 20 includes a washer or ring or wedge washer or bracing member 28 which is positioned around post 22 and adjacent to or against outer wall 24*a* of receiving portion 24. In the illustrated embodiment, bracing member 28 includes a generally cylindrical or conical-shaped sidewall portion or wedge portion 28*a* and a ring portion 28*b* defining a lower annular surface 28*c* and an upper annular surface 28*d*. Sidewall portion 28*a* may be generally correspondingly formed with the inner surface of sidewall 24*a* of receiving portion 24 and may be loosely positioned within sidewall 24*a* or may be press fit into receiving portion 24 and along sidewall 24*a* to position bracing portion 28 at least partially within receiving portion 24 and between outer sidewall 24*a* and support post 22. Because the sidewall 24*a* may have a conical-shaped or sloped or narrowing surface, bracing member 28 may be moved and/or pressed longitudinally along and downward (such as in the direction of arrow A in FIG. 5) into receiving portion 24 until bracing member 28 is at a desired or appropriate position along receiving portion 24 and post 22, where sidewall portion 28*a* of bracing member 28 may engage the inner surface of outer wall 24*a* of receiving portion 24, as can be seen in FIGS. 5 and 6.

Ring portion 28*b* of bracing member 28 extends radially inward from sidewall portion 28*a* and may be spaced from post 22, such that a gap 29 exists between an inner edge or end of bracing member 28 and post 22 to facilitate non-contacting movement of bracing member 28 relative to post 22. Although the gap 29 may allow for non-contacting movement of bracing member 28 around post 22 and may reduce any potential for binding between the components, it is envisioned that ring portion 28*b* of bracing member 28 may extend substantially or entirely between outer wall portion 24*a* of receiving portion 24 and post 22, and may slidably engage or contact post 22, without affecting the scope of the present invention.

Pivot joint 20 may further include a retaining spring or spring clip 30 positioned around post 22 and generally above and in engagement with bracing member 28. Spring clip 30 engages bracing member 28 to retain bracing member 28 and limit upward longitudinal movement of bracing member 28 relative to post 22. As can be seen with reference to FIGS. 4 and 5, spring clip 30 may be a generally circular disc having an inner retaining tab portion 30*a* which slidably engages post 22 as spring clip is press fit onto post 22, a base portion 30*b* which defines a generally flat annular surface 30*c* for engaging upper surface 28*d* of bracing member 28, and an outer circumferential wall or tab 30*d* extending generally upward from an outer edge of base portion 30*b*. Spring clip 30 may be press fit around post 22 and may engage or bite into post 20 to limit or substantially preclude upward longitudinal movement of spring clip 30 along post 22. Optionally, spring clip 30 may slide along post until an inner edge 30*a* slides into engagement with a notch or groove (not shown) around post 22 to retain spring clip 30 in position around post 22, without affecting the scope of the present invention.

The U-shaped ring 25 of receiving portion 24 may be configured to at least partially receive biasing member or spring 26 therein. Biasing member 26 may be positioned at least partially within U-shaped ring 25 and between base portion 24*c* and lower annular surface 28*c* of bracing member 28, when bracing member 28 has been moved or pressed into position at least partially within receiving portion 24. Biasing member 26 may function to exert a biasing force on base portion 24*c* to bias or urge receiving portion 24 downward relative to bracing member 28 (which may be substantially fixed in position relative to post 22 and thus restrained against upward longitudinal movement by spring clip 30) to bias or urge the movable portion into engagement with one or more detents of fixed portion 14.

When joint assembly 20 is assembled, bracing member 28 thus may be biased or urged upwardly by biasing member 26 such that bracing member 28 is pressed against spring clip 30, which is substantially fixed relative to post 22. The other end of biasing member 26 presses downward on base portion 24c of receiving portion 24, such that the receiving portion 24 of movable portion 16 engages the detents to substantially retain movable portion 16 relative to base portion 14 of mirror assembly 10. As movable portion 16 is pivoted about pivot axis 20a, such as by manually pivoting movable portion 16 relative to base portion 14, biasing member 26 may compress as receiving portion 24 slides outward from the detent or detents and, thus, as sidewall 24a slides along wall or wedge portion 28a of bracing member 28.

As or after receiving portion 24 is slid outward from the detents, movable portion 16 may pivot about pivot axis 20a as upper surface 28d of bracing member 28 may rotationally slide relative to lower surface 30d of spring retainer 30. It is envisioned that bracing member 28 may comprise a plastic or polymeric material, which may provide a low coefficient of friction surface at the interface with spring clip 30 to facilitate generally smooth movement of bracing member 28 relative to spring clip 30 as movable portion 16 is moved or pivoted relative to base portion 14. Movable portion 16 may be pivoted until the tabs or detents of receiving portion 24 arrive at corresponding detents or tabs of base portion 14, whereby the movable portion 16 may be substantially retained in a second detent position via biasing member or spring 26.

Bracing member 28 thus may provide an interface member between the upper end of the biasing member 26 and the retaining clip or spring clip 30. The bracing member may slidably engage the spring clip 30 and/or biasing member 26, and may provide a low friction surface to enhance pivotable movement of movable portion 16 relative to base portion 14. Also, because bracing member 28 may extend substantially entirely between the outer wall 24a of receiving portion 24 and the post 22, the bracing member also may reduce the lateral head displacement relative to post 22 which may otherwise occur due to the gap between the inner wall 24b of receiving portion 24 and post 22 and the gap between outer wall 24a and spring clip 30. The lateral head displacement may be further reduced by reducing or eliminating the gap 29 between bracing member 28 and post 22. Because bracing member 28 may be frictionally engaged with outer wall 24a of receiving portion 24 and with lower surface 30c of spring clip 30, bracing member 28 may also provide enhanced vibrational performance for exterior rearview mirror assembly 10 via a substantially tight engagement with the receiving portion and the spring clip. For example, the bracing member 28 may provide a first mode frequency which is increased by approximately ten percent or more over conventional breakaway joint assemblies.

Figure 7:
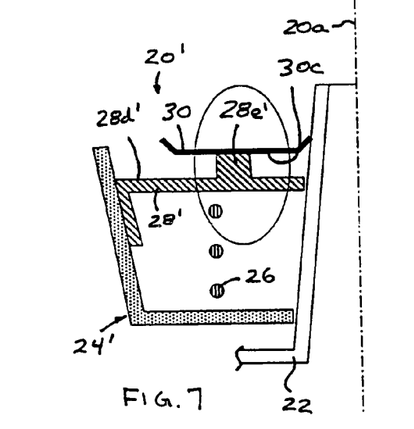
FIG. 7 is a sectional view of one side of another breakaway pivot joint in accordance with the present invention.

Optionally, and as shown in FIG. 7, a breakaway joint 20' may include a washer or bracing member 28' which has an upper surface 28d' which may include one or more raised ribs 28e', which engage lower surface 30c of retainer 30. The small standoffs or raised ribs 28e' may reduce the contact surface area between the bracing member 28' and the retainer clip 30. Such an arrangement may reduce the friction between bracing member 28' and retainer clip 30 and, thus, may lead to a reduction in the force required to fold or pivot the head portion relative to the base portion of the mirror assembly.

Figure 8:
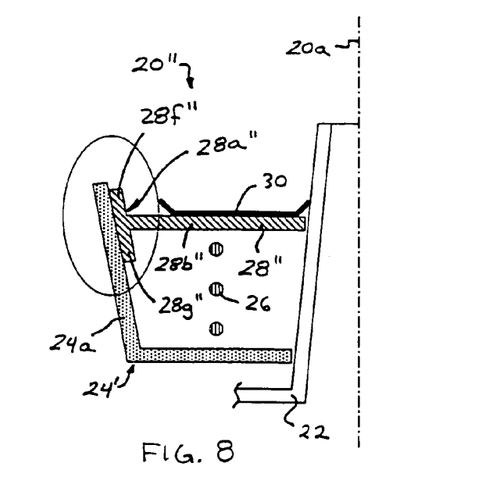
FIG. 8 is a sectional view of one side of another breakaway pivot joint in accordance with the present invention.

Optionally, and as shown in FIG. 8, a breakaway pivot joint 20" may include a bracing member 28", which may include an outer generally cylindrical or conical-shaped portion 28a" extending above and below a ring portion 28b". More particularly, generally cylindrical or conical-shaped portion 28a" may include an upper portion 28f" extending outwardly above ring portion 28b" and a lower portion 28g" extending downwardly (and may extend radially inwardly as shown in FIG. 8) below ring portion 28b". The bracing member 28" thus may provide a cylindrical disc or ring portion with wedge shaped or conical-shaped or sloped ribs or wall portions extending in the upward and downward direction along the conical-shaped or sloped surface of the outer wall 24a of receiving portion 24'. The upper and lower portions may limit rocking of bracing member 28" relative to outer wall 24a of receiving portion 24'.

Figure 9:
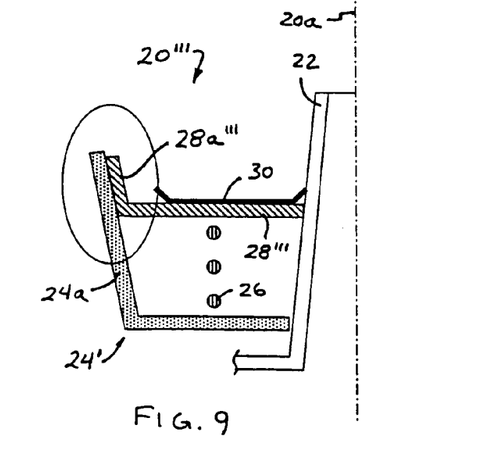
FIG. 9 is a sectional view of one side of yet another breakaway pivot joint in accordance with the present invention.

Optionally, and as shown in FIG. 9, a breakaway joint 20''' may include a bracing member 28''', which may include an outer generally cylindrical or conical-shaped portion 28a''' extending upwardly (and maybe radially outwardly as shown in FIG. 9) from a ring portion 28b'''. Conical-shaped portion 28a''' may engage the generally cylindrical or conical-shaped outer wall 24a of receiving portion 24'. The upward extending conical-shaped wall portion 28a''' thus may define an inverted cup relative to the downward extending conical-shaped wall portion 28a, but wedge member or bracing member 28''' may otherwise be substantially similar to bracing member 28, discussed above, such that a detailed discussion will not be repeated herein.

Although several specific embodiments or designs are shown in the drawings and discussed herein, clearly, the scope of the present invention may cover other embodiments having some of the aspects or characteristics discussed herein and/or sharing aspects or characteristics from two or more of the embodiments of the present invention discussed herein. Also, although shown as having a support or post extending from the base or fixed portion and being received in a receiving portion of the head of the mirror assembly, the pivot joint assembly may have the receiving portion at the base of the mirror assembly and the support or post or the like at the head portion, without affecting the scope of the present invention.

Therefore, the present invention provides a pivot joint or breakaway joint assembly for an exterior rearview mirror assembly which includes a washer member or bracing member. The bracing member may be positioned generally around a support or post of a base portion of the mirror assembly and may be press fit or engaged with an inner surface of a sidewall of the movable portion of the mirror assembly. The bracing member may provide for enhanced sliding engagement or frictional engagement with a spring clip or retainer as the movable portion is pivoted relative to the base portion. The frictional engagement between the bracing member and both the spring clip and the sidewall of the movable portion may provide for enhanced vibrational performance of the exterior rearview mirror assembly. The bracing member may substantially extend between the sidewall of the movable portion and the pivot post or support of the base portion. The bracing member thus may reduce head displacement or head rock of the movable portion or head portion relative to the base portion of the mirror assembly.

Changes and modifications in the specifically described embodiments may be carried out without departing from the principles of the present invention, which is intended to be limited only by the scope of the appended claims as interpreted according to the principles of patent law.

The embodiments of the invention in which an exclusive property or privilege as claimed are defined as follows:

1. An exterior rearview mirror assembly for a vehicle comprising:
   a base portion adapted for mounting to the vehicle, said base portion including a support member which generally defines a pivot axis;
   a movable portion pivotally mounted to said base portion and pivotable about said pivot axis, said movable portion including a receiving portion for at least partially receiving said support member therethrough, said receiving portion including a base portion and an outer portion extending upward from said base portion of said receiving portion, said outer portion having an inner surface that is spaced from and opposed to said support member when said support member is at least partially received by said receiving portion;
   a bracing member;
   said bracing member being disposed radially between said inner surface of said outer portion of said receiving portion and said support member, said bracing member substantially extending radially between said inner surface of said outer portion of said receiving portion and said support member so as to reduce displacement of said movable portion relative to said base portion in a direction generally transverse to said pivot axis;
   said mirror assembly including a retaining clip positioned at least partially round said support member, said retaining clip engaging said bracing member and limiting longitudinal movement of said bracing member relative to said support member in a direction generally along said pivot axis; and
   said inner surface of said outer portion of said receiving portion being slidably movable relative to said bracing member in the longitudinal direction, said bracing member being rotationally slidable relative to at least one of said inner surface of said outer portion of said receiving portion and said retaining clip in response to rotational movement of said receiving portion relative to said support member about said pivot axis.

2. The exterior rearview mirror assembly of claim 1, wherein said bracing member defines a gap between an inner edge of said bracing member and s-aid support member.

3. The exterior rearview mirror assembly of claim 1, wherein said bracing member slidably engages said support member.

4. The exterior rearview mirror assembly of claim 1 including a biasing member which functions to bias a detent engaging portion of said receiving portion away from said bracing member and said retaining clip.

5. The exterior rearview mirror assembly of claim 4, wherein said biasing member biases said receiving portion into at least one detent position to substantially retain said movable portion relative to said base portion.

6. The exterior rearview minor assembly of claim 1, wherein said bracing member comprises a polymeric material.

7. The exterior rearview minor assembly of claim 6, wherein said bracing member provides a low friction surface for engaging said retaining clip.

8. The exterior rearview mirror assembly of claim 6, wherein said bracing member provides a low friction surface for engaging said inner surface of said outer portion of said receiving portion.

9. The exterior rearview mirror assembly of claim 1, wherein said retaining clip is substantially fixedly positioned around said support member.

10. The exterior rearview mirror assembly of claim 1, wherein said receiving portion defines a generally conical-shaped sidewall at least partially surrounding said support member.

11. The exterior rearview mirror assembly of claim 10, wherein said bracing member engages said sidewall and extends radially inward from said sidewall toward said support member.

12. The exterior rearview mirror assembly of claim 11, wherein said bracing member includes a generally conical-shaped outer portion for engaging said sidewall of said receiving portion.

13. The exterior rearview mirror assembly of claim 12, wherein said generally conical-shaped. outer portion of said bracing member extends upward and/or downward from an inwardly extending ring portion of said bracing member.

14. The exterior rearview mirror assembly of claim 11, wherein said bracing member extends substantially between said sidewall and said support member to limit lateral displacement of said movable portion relative to said support member of said base portion.

15. The exterior rearview mirror assembly of claim 1, wherein said bracing member includes at least one raised rib along a surface thereof, said at least one raised rib being configured to engage a corresponding surface of said retaining clip and to be slidable relative to said corresponding surface of said retaining clip.

16. An exterior rearview mirror assembly for a vehicle comprising:
   a base portion adapted for mounting to the vehicle;
   a movable portion pivotally mounted to said base portion and pivotable relative to said base portion about a pivot axis; and
   a pivot joint assembly pivotally mounting said movable portion to said base portion, said pivot joint assembly including:
      a support member which generally defines said pivot axis;
      a receiving portion for at least partially receiving said support member theretbrough, said receiving portion including a base portion and an outer portion extending upward from said base portion of said receiving portion, said outer portion having an inner surface that is being-spaced from and onposed to said support member when said support member is at least partially received by said receiving portion;
      a bracing member disposed radially between said inner surface of said outer portion of said receiving portion and said support member, said bracing member substantially extending radially between said outer portion of said receiving portion and said support member so as to reduce lateral displacement of said movable portion relative to said base portion in a direction generally transverse to said pivot axis, said inner surface of said outer portion of said receiving portion being slidably movable relative to said bracing member in the longitudinal direction; and
      a retaining clip positioned at least partially around said support member, said retaining clip engaging said bracing member and limiting longitudinal movement of said bracing member relative to said support member in a direction generally along said pivot axis, said bracing member being rotationally slidable relative to at least one of said inner surface of said outer portion of said receiving portion and said retaining clip in response to rotational movement of said receiving portion relative to said support member about said pivot axis.

17. The exterior rearview mirror assembly of claim 16, wherein said bracing member defines a gap between an inner edge or said bracing member and said support member.

18. The exterior rearview mirror assembly of claim 16, wherein said bracing member slidably engages said support member.

19. The exterior rearview minor assembly of claim 16 including a biasing member which functions to bias a detent engaging portion of said receiving portion away from said bracing member and said retaining clip.

20. The exterior rearview mirror assembly of claim 19, wherein said biasing member biases said detent engaging portion of said receiving portion into at least one detent position to substantially retain said movable portion relative to said base portion.

21. The exterior rearview mirror assembly of claim 16, wherein said bracing member comprises a polymeric material.

22. The exterior rearview mirror assembly of claim 21, wherein said bracing member provides a low friction surface for engaging said retaining clip.

23. The exterior rearview mirror assembly of claim 21, wherein said bracing member provides a low friction surface for engaging said inner surface of said outer portion of said receiving portion.

24. The exterior rearview mirror assembly of claim 16, wherein said retaining clip is substantially fixedly positioned around said support member.

25. The exterior rearview mirror assembly of claim 16, wherein said receiving portion defines a generally conical-shaped sidewall at least partially surrounding said support member.

26. The exterior rearview mirror assembly of claim 25, wherein said bracing member engages said sidewall and extends radially inward from said sidewall toward said support member.

27. The exterior rearview mirror assembly of claim 26, wherein said bracing member includes a generally conical-shaped outer portion for engaging said sidewall of said receiving portion.

28. The exterior rearview mirror assembly of claim 27 wherein said generally conical-shaped outer portion of said bracing member extends upward and/or downward from an inwardly extending ring portion of said bracing member.

29. The exterior rearview mirror assembly of claim 26, wherein said bracing member extends substantially between said sidewall and said support member to limit lateral displacement of said movable portion relative to said support member of said base portion.

30. The exterior rearview mirror assembly of claim 16, wherein said bracing member includes at least one raised rib along a surface thereof, said at least one raised rib being configured to engage a corresponding surface of said retaining clip and to be slidable relative to said corresponding surface of said retaining clip.

31. The exterior rearview mirror assembly of claim 16, wherein said support member extends from said base portion and said receiving portion is formed in said movable portion.

32. A pivot joint assembly for an exterior rearview mirror assembly of a vehicle, said pivot joint assembly pivotally mounting a movable portion to a base portion of the mirror assembly, the movable portion being pivotable about a pivot axis relative to the base portion when mounted thereto, said pivot joint assembly comprising:

a support member which generally defines said pivot axis;

a receiving portion for at least partially receiving said support member therethrough, said receiving portion having a base portion and an outer portion extending upward from said base portion, said outer portion having an inner surface that is spaced from and opposed to said support member when said support member is at least partially received by said receiving portion;

a bracing member disposed radially between said inner surface of said outer portion of said receiving portion arid said support member, said bracing member substantially extending radially between said inner surface of said outer portion of said receiving portion and said support member so as to reduce lateral displacement of said movable portion relative to said base portion in a direction generally transverse to said pivot axis, said inner surface of said outer portion of said receiving portion being slidably movable relative to said bracing member in the longitudinal direction; and a retaining clip positioned at least partially around said support member, said retaining clip engaging said bracing member and limiting longitudinal movement of said bracing member relative to said support member in a direction generally along said pivot axis, said bracing member being rotationally slidable relative to at least one of said inner surface of said outer portion of said receiving portion and said retaining clip in response to rotational movement of said receiving portion relative to said support member about said pivot axis.

33. The pivot joint assembly of claim 32, wherein said bracing member defines a gap between an inner edge of said bracing member and said support member.

34. The pivot joint assembly of claim 32, wherein said bracing member slidably engages said support member.

35. The pivot joint assembly of claim 32 including a biasing member which functions to bias a detent engaging portion of said receiving portion away from said bracing member and said retaining clip.

36. The pivot joint assembly of claim 35, wherein said biasing member biases said detent engaging portion of said receiving portion into at least one detent position to substantially retain said receiving portion relative to said support member.

37. The pivot joint assembly of claim 32, wherein said bracing member comprises a polymeric material.

38. The pivot joint assembly of claim 37, wherein said bracing member provides a low friction surface for engaging said retaining clip.

39. The pivot joint assembly of claim 37, wherein said bracing member provides a low friction surface for engaging said inner surface of said outer portion of said receiving portion.

40. The pivot joint assembly of claim 32, wherein said retaining clip is substantially configured to be fixedly positioned around said support member.

41. The pivot joint assembly of claim 32, wherein said receiving portion defines a generally conical-shaped sidewall at least partially surrounding said support member.

42. The pivot joint assembly of claim 41, wherein said bracing member engages said sidewall and extends radially inward from said sidewall toward said support member.

43. The pivot joint assembly of claim 42, wherein said bracing member includes a generally conical-shaped outer portion for engaging said sidewall of said receiving portion.

44. The pivot joint assembly of claim 43, wherein said generally conical-shaped outer portion of said bracing member extends upward and/or downward from an inwardly extending ring portion of said bracing member.

45. The pivot joint assembly of claim 42. wherein said bracing member extends substantially between said sidewall and said support member to limit lateral displacement of said receiving portion relative to said support member.

46. The pivot joint assembly of claim 32, wherein said bracing member includes at least one raised rib along a surface thereof, said at least one raised rib being configured to engage a corresponding surface of said retaining clip and to be slidable relative to said corresponding surface of said retaining clip.

\* \* \* \* \*

UNITED STATES PATENT AND TRADEMARK OFFICE
CERTIFICATE OF CORRECTION

PATENT NO.       : 7,165,852 B2
APPLICATION NO.  : 10/795628
DATED            : January 23, 2007
INVENTOR(S)      : Pavao et al.

It is certified that error appears in the above-identified patent and that said Letters Patent is hereby corrected as shown below:

Column 7
Claim 1, Line 27, "reduce displacement" should be --reduce lateral displacement--
Claim 1, Line 31, "round" should be --around--
Claim 2, Line 45, "s-aid" should be --said--
Claim 6, Line 58, "minor" should be --mirror--
Claim 7, Line 61, "minor" should be --mirror--

Column 8
Claim 16, Line 43, "theretbrough" should be --therethrough--
Claim 16, Line 47, "being-" should be deleted
Claim 16, Line 47, "onposed" should be --opposed--

Column 9
Claim 17, Line 7, "edge or" should be --edge of--
Claim 19, Line 11, "minor" should be --mirror--

Column 10
Claim 32, Line 14, "arid" should be --and--

Column 11,
Claim 45, Line 5, "42." should be --42,--

Signed and Sealed this

Twentieth Day of January, 2009

JON W. DUDAS
*Director of the United States Patent and Trademark Office*